(12) United States Patent
Sherin et al.

(10) Patent No.: US 8,616,948 B2
(45) Date of Patent: Dec. 31, 2013

(54) MULTI-LAYERED ELECTRONIC PUZZLE

(76) Inventors: John M. Sherin, Jericho, NY (US); Jeremy Zimmerman, East Meadow, NY (US)

(*) Notice: Subject to any disclaimer, the term of this patent is extended or adjusted under 35 U.S.C. 154(b) by 0 days.

(21) Appl. No.: 13/535,575

(22) Filed: Jun. 28, 2012

(65) Prior Publication Data
US 2012/0295680 A1    Nov. 22, 2012

Related U.S. Application Data

(63) Continuation of application No. 12/455,623, filed on Jun. 4, 2009, now Pat. No. 8,308,537.

(51) Int. Cl.
*A63F 9/24* (2006.01)
(52) U.S. Cl.
USPC .......... 463/9; 463/31; 463/37; 463/40; 463/43
(58) Field of Classification Search
None
See application file for complete search history.

(56) References Cited

U.S. PATENT DOCUMENTS

| | | | |
|---|---|---|---|
| 3,495,838 A | 2/1970 | Wesley | |
| 4,815,742 A | 3/1989 | Augustine | |
| 5,362,054 A | 11/1994 | Ashemimry | |
| 5,556,339 A | 9/1996 | Cohen | |
| 5,647,796 A | 7/1997 | Cohen | |
| 5,823,532 A | 10/1998 | Goldwasser et al. | |
| 5,844,570 A | 12/1998 | Curtright et al. | |
| 6,102,796 A | 8/2000 | Pajitnov et al. | |
| 6,146,273 A | 11/2000 | Olsen | |
| 6,266,068 B1 | 7/2001 | Kang et al. | |
| 6,522,341 B1 | 2/2003 | Nagata | |
| 6,579,178 B1 | 6/2003 | Walker et al. | |
| 6,604,997 B2 | 8/2003 | Saidakovsky et al. | |
| 6,685,186 B2 | 2/2004 | Wilson | |
| 6,856,323 B2 | 2/2005 | Moore | |
| 6,906,762 B1 | 6/2005 | Witehira et al. | |
| 7,874,908 B2 | 1/2011 | Walker et al. | |
| 2002/0055379 A1 | 5/2002 | Saidakovsky et al. | |
| 2004/0204229 A1 | 10/2004 | Walker et al. | |
| 2006/0252519 A1 | 11/2006 | Walker et al. | |
| 2008/0076097 A1 | 3/2008 | Sherin | |
| 2009/0035733 A1 | 2/2009 | Meitar et al. | |
| 2009/0322761 A1 | 12/2009 | Phills | |
| 2010/0190145 A1 | 7/2010 | Singer et al. | |

*Primary Examiner* — David E Graybill
(74) *Attorney, Agent, or Firm* — Dilworth & Barrese, LLP.

(57) ABSTRACT

A system for generating an electronic puzzle for a user that includes a user interface; a processor in communication with the user interface; and a memory in communication with the processor. The processor is effective to receive a first image and a second set of images; break the first image into a plurality of first pieces; create a plurality of partitions corresponding to the first image and the second set of images, each partition defining an area.

2 Claims, 6 Drawing Sheets

MULTI-LAYERED ELECTRONIC PUZZLE

PRIORITY

This is a continuation of U.S. patent application Ser. No. 12/455,623 filed Jun. 4, 2009 to which priority is claimed and which is herein incorporated by reference.

BACKGROUND OF THE INVENTION

1. Field of the Invention

This disclosure relates to a system and method for generating an electronic puzzle and, more particularly, to a system and method for generating a multi-layered electronic puzzle.

2. Description of the Related Art

Jigsaw puzzles are known. In such puzzles, a source image is broken into a plurality of pieces with varying shapes. The pieces and shapes are designed so that they may be placed together to re-form the original source image. Electronic puzzles have also been used where the source image is displayed on a user interface such as a computer screen. The source image is broken into a plurality of electronic pieces of varying shapes. Those electronic pieces are designed so that they may be placed together to re-form the original source image. This disclosure describes an improvement of these prior art technologies.

SUMMARY OF THE INVENTION

One embodiment of the invention is a method for generating an electronic puzzle for a user. The method comprises receiving, at a processor, a first image and a second set of images; breaking, at the processor, the first image into a plurality of first pieces; and creating, at the processor, a plurality of partitions corresponding to the first image and the second set of images, each partition defining an area. The method further comprises displaying the first pieces to the user on a user interface; receiving a first request, at the processor, from a user to release a particular first piece at a first location; when the first location is inside an area of a first particular partition corresponding to the particular first piece, displaying the first piece in the first particular partition on the user interface. The method further comprises displaying the second set of images to the user on the user interface; receiving a second request, at the processor, from the user to release a particular one of the second images at a second location; and when the second location is inside an area of a second particular partition corresponding to the particular one of the second images, displaying the particular one of the second images in the second particular partition on the user interface.

Another embodiment of the invention is a system for generating an electronic puzzle for a user. The system comprises a user interface; a processor in communication with the user interface; and a memory in communication with the processor. The processor is effective to receive a first image and a second set of images; break the first image into a plurality of first pieces; and create a plurality of partitions corresponding to the first image and the second set of images, each partition defining an area. The processor is further effective to display the first pieces to the user on a user interface; receive a first request from a user to release a particular one of the first pieces at a first location; when the first location is inside an area of a first particular partition corresponding to the particular first piece, display the first piece in the first particular partition on the user interface. The processor is further effective to display the second set of images to the user on the user interface; receive a second request from the user to release a particular one of the second images at a second location; and when the second location is inside an area of a second particular partition corresponding to the particular one of the second images, display the particular one of the second images in the second particular partition on the user interface.

BRIEF DESCRIPTION OF THE DRAWINGS

The drawings constitute a part of the specification and include exemplary embodiments of the present invention and illustrate various objects and features thereof.

DETAILED DESCRIPTION OF THE PREFERRED EMBODIMENT(S)

Figure 1:
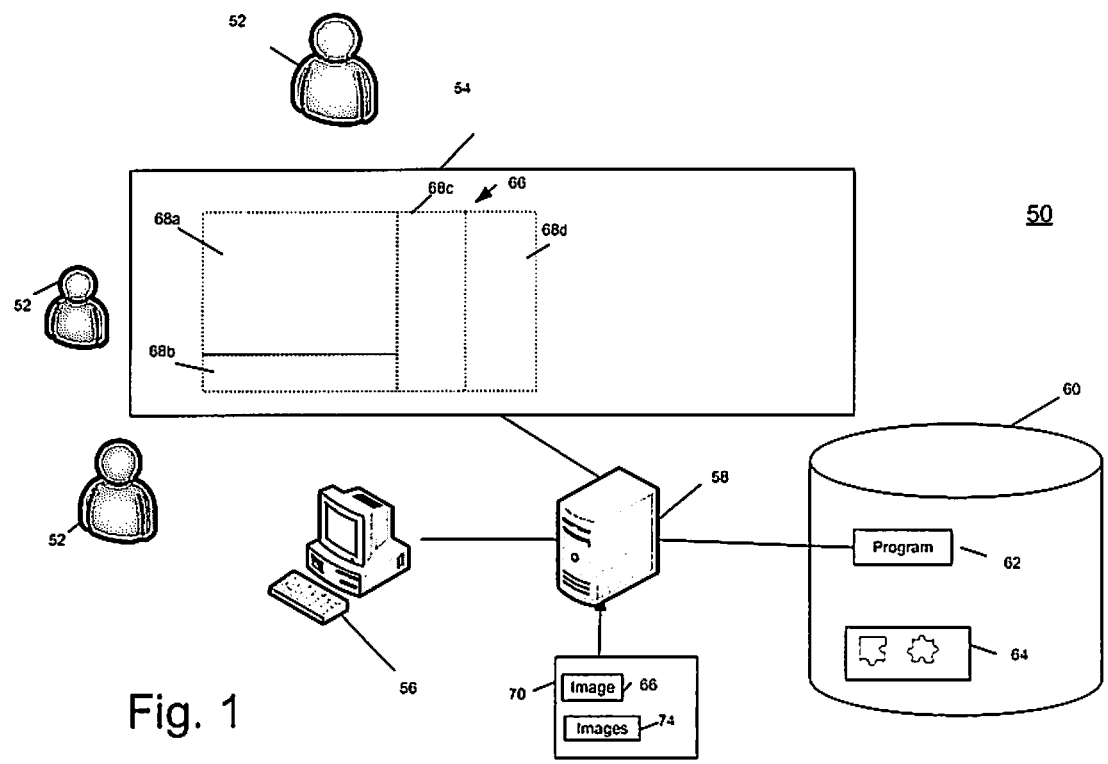
FIG. 1 is system diagram of a system effective to generate a multi-layered electronic puzzle in accordance with an embodiment of the invention.

Various embodiments of the invention are described hereinafter with reference to the figures. Elements of like structures or function are represented with like reference numerals throughout the figures. The figures are only intended to facilitate the description of the invention or as a guide on the scope of the invention. In addition, an aspect described in conjunction with a particular embodiment of the invention is not necessarily limited to that embodiment and can be practiced in conjunction with any other embodiments of the invention.

Referring to FIG. 1, there is shown a system 50 effective to generate a multi-layered electronic jigsaw puzzle. System 50 includes a processor 58 which could be controlled by a program 62 stored in a memory 60 in communication with processor 58. Program 62 controls processor 58 to display jigsaw images 64 on a user interface such as an interactive whiteboard 54 (e.g. a SMART BOARD™) or a monitor 56 or on any other user interface in communication with processor 58. User interface 54, 56 may have a tactile input such that a user 52 can touch user interface 54, 56 and move images displayed thereon.

A source file 70 including an image 66 and a second set of images 74 that may be part of the multi-layered electronic jigsaw puzzle may be sent to processor 58. Program 62 may break up image 66 into a plurality of pieces 72*a*, 72*b*, 72*c*, 72*d*. Program 62 then creates partitions 68 corresponding to pieces 72 and second set of images 74. Upon request by a user 52 to start a puzzle relating to image 66, partitions 68 are assigned to user interface 54, 56 so that program 62 knows where pieces 72 should be placed. Each partition 68 is a defined area (e.g. a set of x and y coordinates) on user interface 54, 56. Partitions 68 are generally not visible to user 52 and are shown in phantom in FIG. 1.

Figure 2:
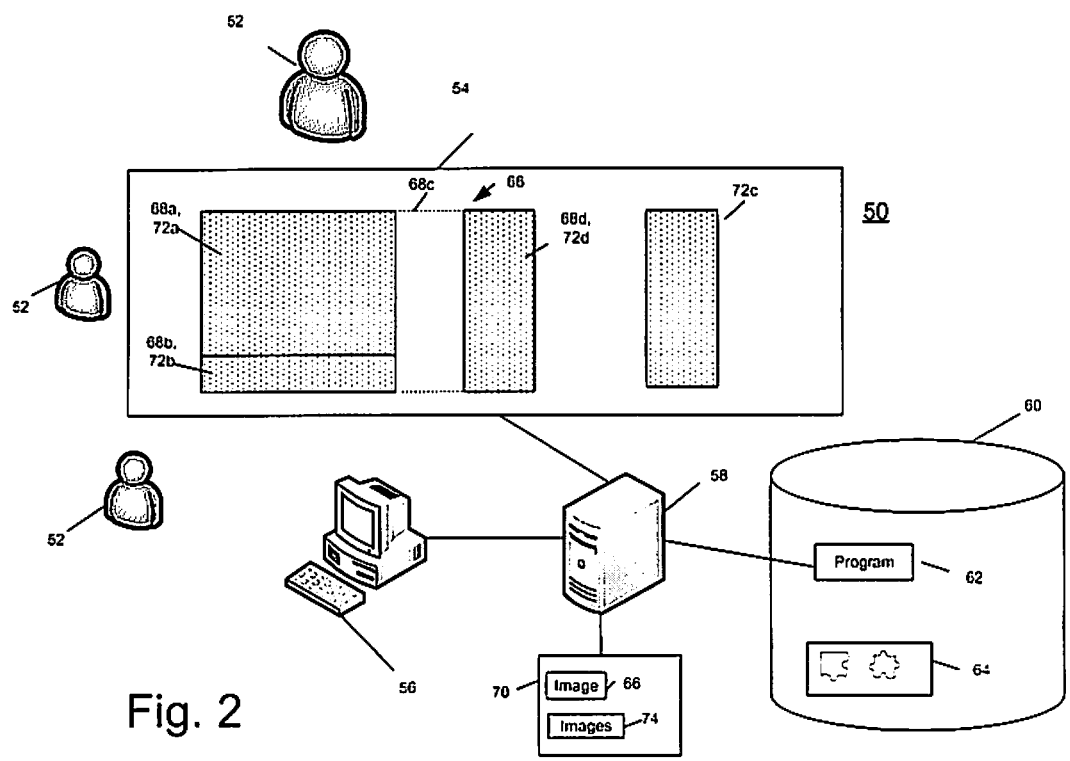
FIG. 2 is system diagram of a system effective to generate a multi-layered electronic puzzle in accordance with an embodiment of the invention.

Referring to FIG. 2, pieces 72 are displayed on user interface 54, 56 and may be moved by user 52 to be placed on the corresponding partitions 68. For example, as shown in FIG. 2, user 52 has moved pieces 72a, 72b, 72d to be placed on corresponding partitions 68a, 68b, 68d. Piece 72c is shown as not yet being placed on corresponding partition 68c of image 66. When user 52 releases a piece 72 such as by pressing or releasing a mouse button or releasing a touch with a SMART BOARD, processor 58 determines a first location (for example, an x, y coordinate at a center or an entire area) of piece 72 with respect to user interface 54, 56. If the first location of piece 72 is inside an area of corresponding partition 68 where piece 72 fits in image 66, program 62 controls processor 58 to lock piece 72 and to control user interface 54, 56 to display piece 72 at a location corresponding to partition 68. Otherwise, program 62 controls processor 58 to display piece 68 at a random location on user interface 54, 56.

Figure 3:
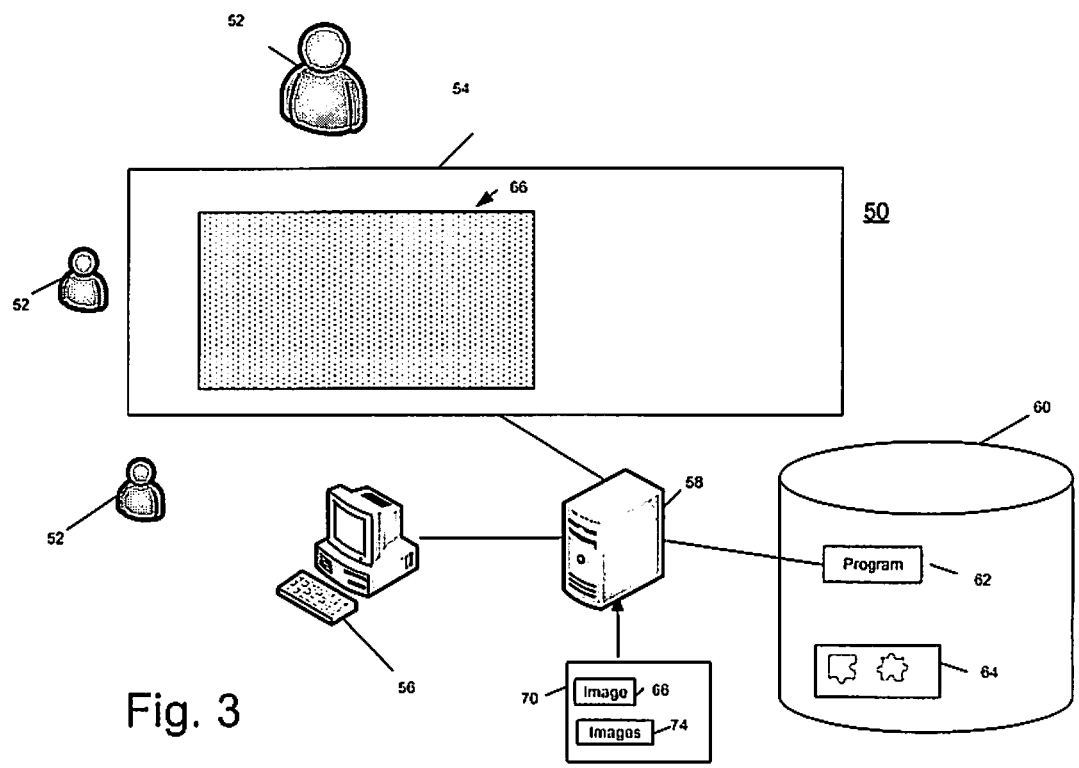
FIG. 3 is system diagram of a system effective to generate a multi-layered electronic puzzle in accordance with an embodiment of the invention.

User 52 may move pieces 72a, 72b, 72c, 72d on user interface 54, 56 until image 66 is re-formed. For example, as shown in FIG. 2, pieces 72a, 72b and 72d have been placed in their respective locations in image 66 while piece 72c is displayed at a location outside of the periphery of image 66 awaiting placement by user 52. Referring to FIG. 3, when all of pieces 72 are placed on corresponding partitions, and processor 58 controls user interface 54, 56 to display all pieces 72, processor 58 further controls user interface 54, 56 to remove lines between pieces 72 so that image 66 appears to be smooth and free of edges. A movie stored in memory 60 may be displayed on top of or in place of image 66 to reward user 52 for re-forming image 66.

Figure 4:
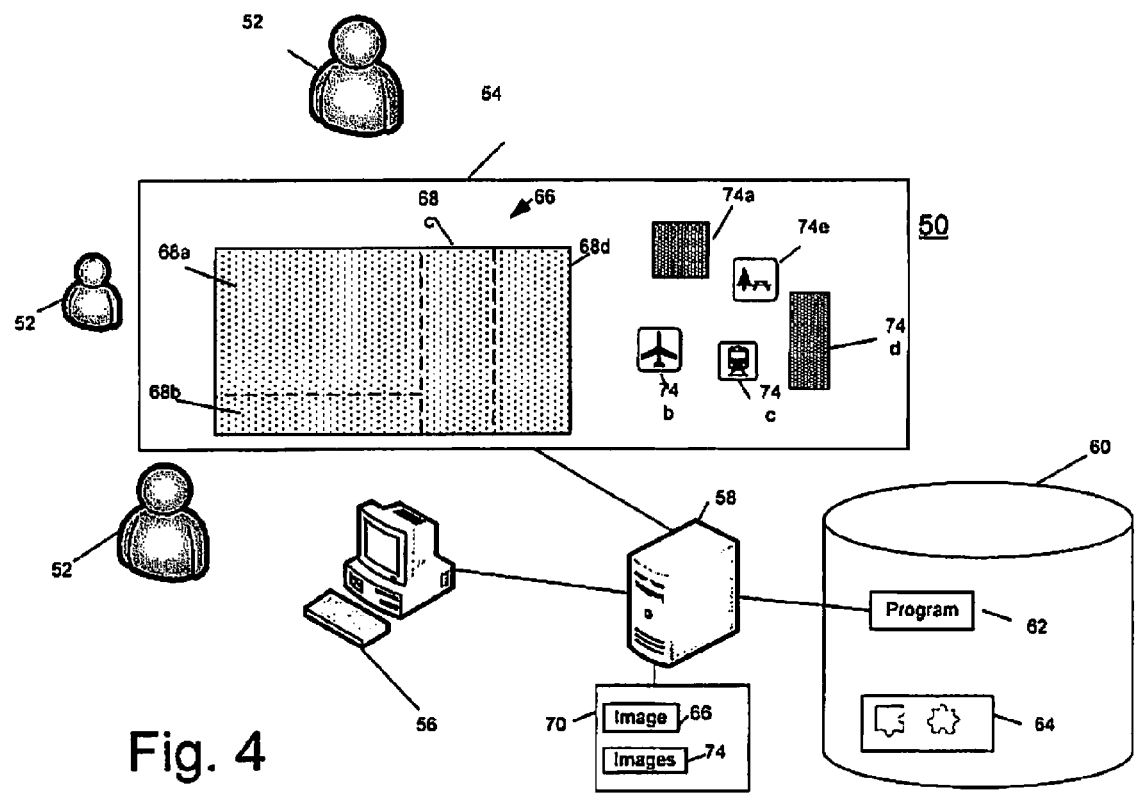
FIG. 4 is system diagram of a system effective to generate a multi-layered electronic puzzle in accordance with an embodiment of the invention.
Figure 5:
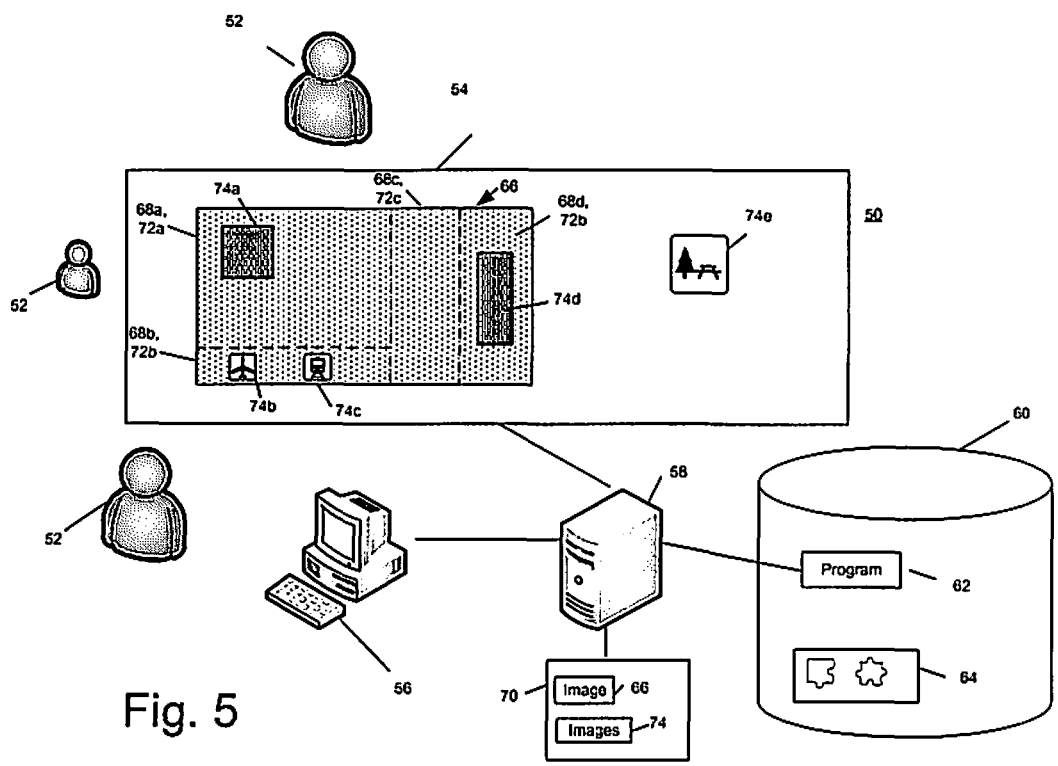
FIG. 5 is system diagram of a system effective to generate a multi-layered electronic puzzle in accordance with an embodiment of the invention.

Referring to FIG. 4, user 52 may now be shown a second set of pieces 74 relating to the set of images 74. For example, image 66 may correspond to a geographic region such as a town or state. Second set of pieces 74 may relate to further information about areas of a town shown in image 66. For example pieces 74 may include labels of place names, cities, counties, towns, villages, hamlets, lighthouses, libraries, locations corresponding to regional neighborhoods, census defined places, landmarks, bridges, civic centers, transportation hubs including air, rail and port facilities, or providers of social services such as fire, police, medical, cultural, and educational institutions. Pieces 74 may remain not visible to user 52 until user 52 forms image 66. User 52 may then move pieces 74 on top of partitions 68 (shown again with phantom lines) in the same way that pieces 72 were placed on partitions 68. Pieces 74 may be used to form an entire new image (not explicitly shown) on top of image 66 or simply be used as labels for image 66. For example, as shown in FIG. 5, piece 74a placed on partition 66a may indicate that a lighthouse (74a) is located in a particular area (66a) of image 66. When a user 52 releases piece 74, processor 58 determines a second location of piece 74. If the second location is inside an area of corresponding partition 68, program 62 controls process 58 to lock image 74 and control user interface 54, 56 to display image 74 at a location corresponding to partition 68. Otherwise, software 62 displays image 74 at a random location.

Rectangular shaped pieces are shown in the figures to simplify the description though it should be clear that pieces of any shape, including those that may conventionally conform to a jigsaw piece shape, may be used. To simplify programming, pieces 72 may be designed so as to only be able to move horizontally and vertically and not be able to be rotated about an axis.

Figure 6:
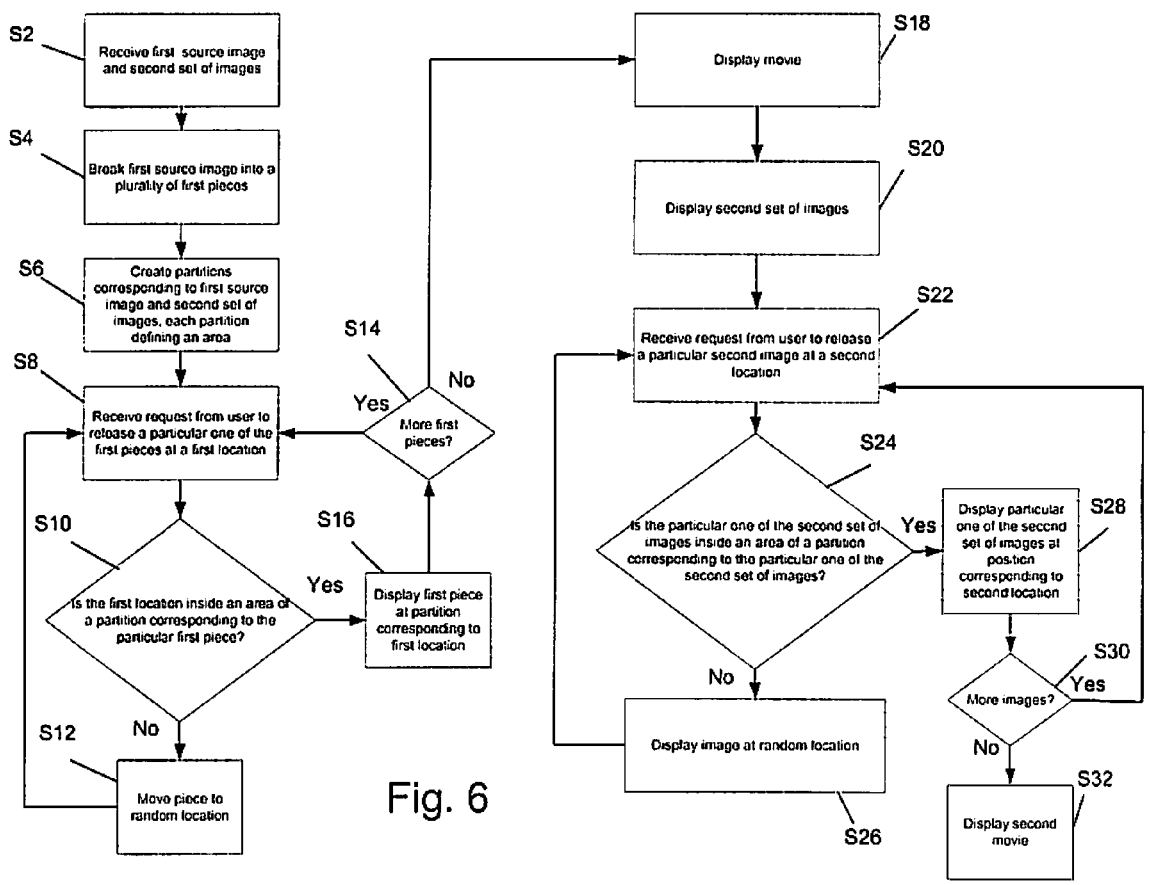
FIG. 6 is a flow chart of a process for generating a multi-layered electronic puzzle in accordance with an embodiment of the invention.

Referring to FIG. 6, there is shown a flow chart illustrating a process for displaying a multi-layered electronic puzzle in accordance with an embodiment of the invention. The process of FIG. 6 could be performed using, for example, system 50 discussed above. As shown, at step S2, a processor may receive a first source image and a second image which may be a set of second images. At step S4, the processor breaks the first source image into a plurality of first pieces. At step S6, the processor creates partitions for the first source image and the second set of images where each partition defines an area and each first piece corresponds to a partition and each one of the second set of images corresponds to a partition. At this point a user may request to play with the electronic puzzle and moves one of the first pieces.

At step S8, a request is received from a user to release a particular one of the first pieces at a first location. At step S10, a query is made to see whether the first location is inside an area of a partition corresponding to the particular first piece. If the answer to query S10 is no, the particular first piece is moved to a random location at step S12. If the answer to query S10 is yes, control branches to step S16 and the particular first piece is displayed at the partition corresponding to the first location. Control branches to step S14, where a query is made as to whether there are more first pieces to be placed. If the answer to query S14 is yes, control branches to step S8. If the answer to query S14 is no, control branches to step S18 where a movie may be displayed congratulating the user.

At step S20, the second set of images are displayed to the user. At step S22, a request is received from the user to release a particular one of the second set of images at a second location—which may be the same as the first location referenced above. At step S24, a query is made as to whether the particular one of the second set of images is inside an area of a partition corresponding to the particular one of the second set of images. If the answer to query S24 is no, the image displayed at a random location at step S26 and control branches to step S22. If the answer to query S24 is yes, control branches to step S28 and the particular one of the second images is displayed at the partition corresponding to the second location. Control branches to step S30, where a query is made as to whether there are more of the second set of images to be placed. If the answer to query S30 is yes, control branches to step S22. If the answer to query S30 is no, control branches to step S32 where a second movie may be displayed congratulating the user.

A system in accordance with the above disclosure may help users enjoy cooperative manipulation of geographic areas of local and regional patterns of housing, land use and preservation, emergency preparedness and designated routes of evacuation.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A method for generating an electronic puzzle for a user, the method comprising:
   receiving, at a processor, an image;
   breaking, at the processor, the image into a plurality of pieces;
   creating, at the processor, a plurality of partitions corresponding to the plurality of pieces, each partition defining an area;
   displaying the pieces to the user on a user interface;
   receiving a first request, at the processor, from a user to release a particular first piece at a first location;

when the first location is inside an area of a first particular partition corresponding to the particular first piece, displaying the first piece in the first particular partition on the user interface;

displaying a set of interactive images to the user on the user interface as an overlay to the plurality of pieces, each of the set of interactive images related to a characteristic displayed on the image;

receiving a second request, at the processor, from the user to interact with a particular interactive image; and displaying content related to the particular interactive image.

2. The method of claim 1, wherein the image is a geographical map and the set of interactive images include at least one of a label of a place name, city, county, town, village, hamlet, lighthouse, library, location corresponding to a regional neighborhood, census defined place, landmark, bridge, civic center, transportation hub including an air, rail or port facility, and a provider of a social service such as fire, police, medical, cultural, or educational institution.

* * * * *